Patented Dec. 28, 1937

2,103,449

UNITED STATES PATENT OFFICE 2,103,449

PROCESS OF PRODUCING BRANDY

Chambers L. Crutchfield, Wailuku, and John P. Foster, Paia, Territory of Hawaii, assignors to Maui Pineapple Company, Ltd., Paia, Territory of Hawaii, a corporation of Territory of Hawaii No Drawing. Application March 25, 1936, Serial No. 70,886

5 Claims. (Cl. 99—37)

Our invention relates to a process of producing brandy from fruits, primarily pineapple, and it has for its principal object the production of a brandy possessing the aroma or bouquet and also the taste of the fruit from which it is made.

Heretofore practically all fruit brandies have been devoid of the bouquet and taste of the fruits from which they are made. For example, brandy produced from grapes has neither the flavor nor odor of grapes. Attempts have been made to impart to brandies fruit characteristics by sophistication, but such adulteration has not been effective to produce the desired result.

Brandy fermented and distilled in the conventional manner from pineapple juice is, like that produced from substantially all other fruit juices, entirely devoid of any of the characteristics of the fresh fruit. We have, however, devised a process for producing brandy from pineapple juice whereby the odor and flavor bearing constituents of the pineapple are conserved so that the brandy, without sophistication of any kind, possesses these characteristics of the fresh fruit.

One of the principal features of the process consists in heating the juice sufficiently prior to fermentation thereof to cause substantially complete coagulation of its normal albumin content.

Another feature of the invention consists in condensing the highly volatile low boiling point products of distillation.

In seeking to produce from pineapple juice a brandy having the flavor and taste of pineapple, all conventional methods of fermentation and distillation and many variations of those methods have been tried by us but the distillate obtained in each case was characterless and possessed neither the aroma nor flavor of pineapple. After repeated experiments, we have discovered that if, prior to fermentation, the juice is heated to a degree sufficient to bring about substantially complete coagulation of the albumins, a distillate rich in esters and consequently distinctive in aroma and bouquet is produced. The effect of coagulating the albumins in producing a distillate having the desired fruit characteristics is not understood, but we have definitely established that unless the juice is treated in this manner prior to fermentation, the product is devoid of the aroma and flavor of pineapple.

In carrying out the process, the pineapple juice, after being expressed from the fruit and screened to remove large pieces of the fruit, is heated in any convenient way to temperatures ranging from 140° F. to 212° F. for whatever time is necessary to bring about substantially complete coagulation of the normal albumin content thereof. The heated juice is then cooled to substantially atmospheric temperature, and preferably to at least as low as 85° F. It is then fermented to approximate dryness.

As fermentation progresses a strong pineapple odor is given off, and as the temperature is raised the intensity of the odor increases. When this phenomenon was first observed by us it led to the deduction, subsequently borne out, that the desirable pineapple odor was highly volatile and that a "hot fermentation" would effect dissipation of this valuable constituent to an undesirable degree. Thus best results are obtained when the fermenting juice is not allowed to exceed 85° F. by any substantial amount, that is, a few degrees. As a too rapid fermentation is difficult to keep at a low temperature, while a too slow fermentation permits the growth of undesirable organisms and allows the escape of the volatile substances before fermentation is complete, fermentation arranged so that it will be virtually complete in approximately twenty-four hours at a temperature of approximately 85° F. has been found to produce optimum results. Even though the fermentation be controlled in the manner indicated, volatile substances having some of the fruit characteristics will be given off and, if desired, a partial condensation of these substances may be effected by means well known to those skilled in the art and the condensate thus obtained subsequently added to the distillate, to be later described.

Upon completion of fermentation, the fermented substance, called mash, is run into a suitable distilling apparatus. When the temperature of the contents of the still reaches from 110° to 130° F., a gas begins to come off having a very pronounced odor of pineapple. This odor continues to be noticeable during the early stages of distillation, decreasing with increase of temperature. The presence of the pineapple odor during the early stages of distillation demonstrates that the desirable fruit characteristics are highly volatile and of low boiling point. Efforts to condense these highly volatile substances of low boiling point at conventional temperatures to retain them in the distillate and thereby produce a brandy having the characteristics of the fruit were unsuccessful, but we have discovered that these substances can be condensed at a temperature of approximately minus 6° F. The substances remaining uncondensed at this temperature are substantially free from pineapple odor, while the condensate is very fragrant. It has been generally accepted among distillers that small amounts of alcohols of high boiling point impart character to the liquor by ageing, but our invention is the opposite of this concept in that we have established that the fruit characteristics are borne by highly volatile substances of low boiling point.

Rather than pass all of the volatile products of condensation through a condenser having an extremely low temperature, such as minus 6° F., it is preferred to conduct them first through any conventional condensing system commonly employed in distilling apparatus to condense the volatiles of high boiling point and then to conduct the remaining volatiles through an auxiliary condenser which is suitably refrigerated to effect a temperature of approximately minus 6° F. wherein the volatiles of low boiling point will be condensed. While the auxiliary condenser may be of any suitable design or construction and the low temperature may be produced by any desired refrigerant or refrigerating medium, it may simply consist of a coil of adequate length, and the desired temperature may be produced by merely packing the coil in a freezing mixture of salt and ice or other low temperature producing medium.

The condensate from the auxiliary condenser which contains a large part of the odor bearing and flavor bearing constituents of the fruit may be led in whole or in part into and mingled with the brandy condensate from the main condensing system of the distilling apparatus and, in order that any desired degree of character may be imparted to the brandy, the auxiliary condensate is preferably mixed in the requisite proportion with the brandy condensate at some convenient point between the condensing system and the "try-box".

The brandy thus formed contains the flavor and aroma of fresh pineapple. While the highly volatile low boiling point esters forming the constituent to which the characteristic odor and flavor are due may be efficiently condensed at minus 6° F., a range of 10° on either side thereof gives acceptable results; and while best results are obtained when the temperature of the fermenting juice is maintained at about 85° F., satisfactory results can be obtained when the temperature of the fermenting juice lies between 50° and 95° F.

What we claim is:

1. In the process of preparing distilled products from pineapple juice, the steps which comprise coagulating the albumins in said juice, fermenting the juice, distilling the fermented juice, and condensing a distillate at a temperature at least low enough to condense highly volatile aroma and flavor bearing constituents of the juice.

2. In the process of preparing distilled products from pineapple juice, the steps which comprise coagulating the albumins in said juice, fermenting the juice at a temperature of about 50° F. to about 95° F., distilling the fermented juice and condensing a distillate at a temperature of about minus 16° F. to plus 4° F.

3. In the process of preparing distilled products from pineapple juice, the steps which comprise heating the juice at a temperature of about 140° F. to 212° F. until the albumins therein are coagulated, fermenting the juice at a temperature of about 85° F., distilling the fermented juice, and condensing a distillate at a temperature of about minus 16° F. to plus 4° F.

4. In the process of preparing distilled products from pineapple juice, the steps which comprise fermenting such a juice in which the albumins have been coagulated, distilling the fermented juice, and condensing a distillate at a temperature at least low enough to condense highly volatile aroma and flavor bearing constituents of the juice.

5. In the process of preparing distilled products from pineapple juice, the steps which comprise fermenting such a juice in which the albumins have been coagulated, distilling the fermented juice, and condensing a distillate at a temperature of about minus 16° F. to plus 4° F.

CHAMBERS L. CRUTCHFIELD.
JOHN P. FOSTER.